Jan. 6, 1970            D. C. DOUGLAS            3,488,090
                        PASSENGER HARNESS
Filed June 19, 1968                        2 Sheets-Sheet 1

INVENTOR.
DWAINE C. DOUGLAS
BY John Cyril Malloy
ATTORNEY.

Jan. 6, 1970   D. C. DOUGLAS   3,488,090
PASSENGER HARNESS
Filed June 19, 1968   2 Sheets-Sheet 2
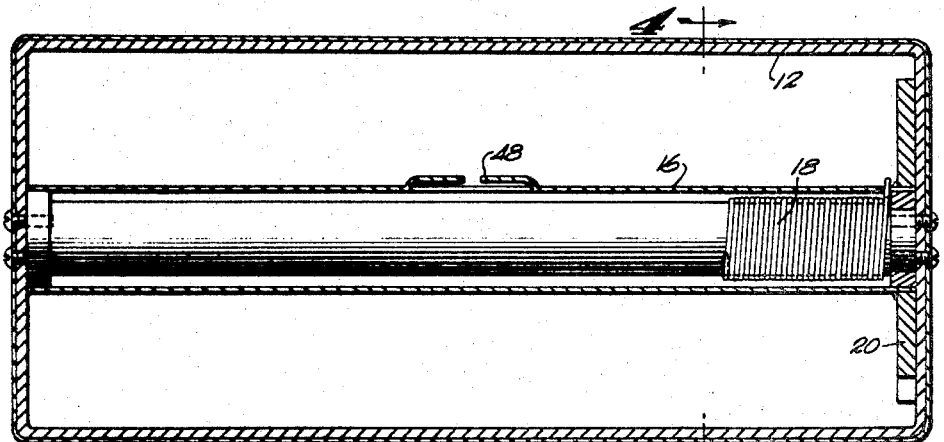
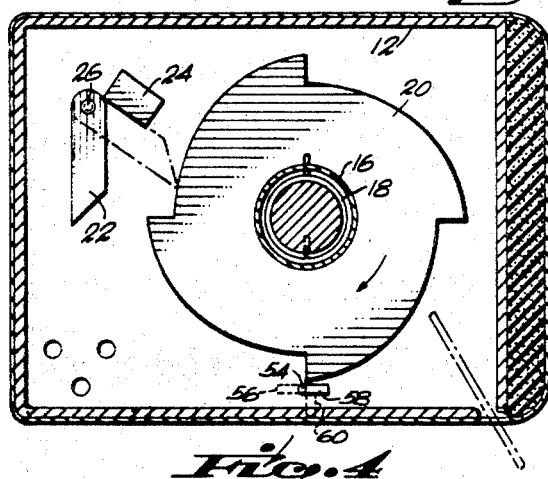
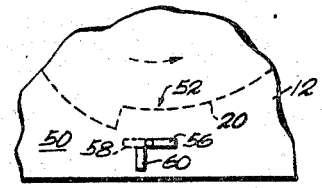
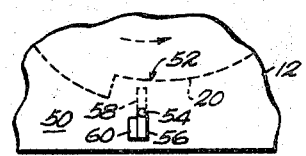
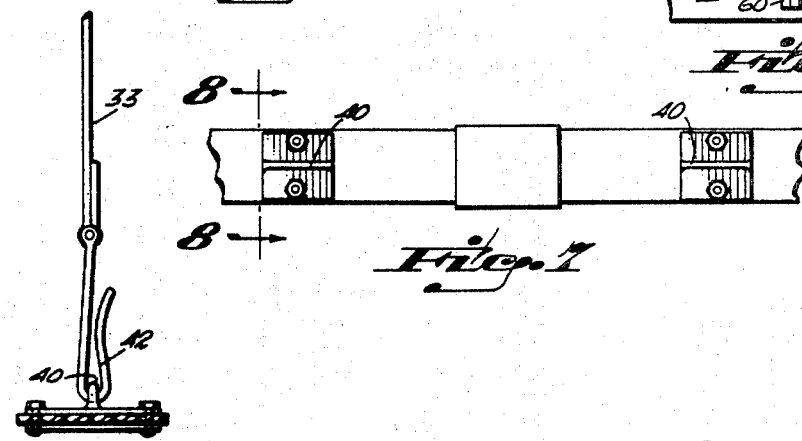
INVENTOR.
DWAINE C. DOUGLAS
BY John Cyril Malloy
ATTORNEY.

United States Patent Office 3,488,090
Patented Jan. 6, 1970

3,488,090
PASSENGER HARNESS
Dwaine C. Douglas, Homestead, Fla.
(4322 E. Jefferson, Grand Prairie, Tex. 75050)
Filed June 19, 1968, Ser. No. 738,159
Int. Cl. B60r 21/10; A62b 35/00, 35/02
U.S. Cl. 297—389                             7 Claims

ABSTRACT OF THE DISCLOSURE

An improved harness for use in combination with a lap type seat belt by automobile passengers; the harness is adapted to be housed within a conventional headrest adapted to be secured to the seat back of a vehicle; it includes a shoulder harness with straps in a coiled position on a shaft so that it is adapted to be fed through an opening in the housing to secure a person in the vehicle; the terminal ends of the harness connect to the lap type seat belt while the proximal end remains secured to the shaft; lock means are provided which are responsive to deceleration of the vehicle so that the shaft will not turn under this condition and a wearer will be restrained until the thrust forces of the deceleration condition are terminated.

---

This invention relates to an improved harness for use in combination with a lap type seat belt by automobile passengers. The harness is of the type known as a shoulder harness and is of inverted Y form. It is adapted to be housed within a headrest to be secured to a seat back of a vehicle. Normally, the harness is coiled on a spring biased shaft journalled within the housing and arranged to be fed on rotation of the shaft through a slit in the housing when the free ends or terminal ends are pulled so that a person may secure himself in the vehicle. The proximal end of the harness is secured to the shaft and the shaft includes a lock arrangement which is responsive to inertia forces to prohibit rotation of the shaft and thus resist thrust forces on a wearer only when the vehicle is under a high rate of deceleration. When the vehicle is not under a high rate of deceleration the person is able to enjoy a limited range of movement by reason of the fact that the shoulder harness will feed from the shaft as it rotates under the influence of pulling forces of withdrawal such as will occur when the person leans forward and, when the person leans backward, a spring will cause the shaft to rotate to coil the harness straps thereabout.

It is a general object of this invention to provide an improved safety device and shoulder harness which is adapted to be secured in the conventional headrest of an automobile and which includes means to secure a person in the seat, especially in response to forces of deceleration.

It is also an object of this invention to provide an improved passenger harness which is adapted to be housed within a headrest and to be used in combination with conventional lap type seat belts.

It is another object of this invention to provide an improved safety device to restrain the upper portion of the body of an occupant of a vehicle seat from tilting forwardly into the steering column, dashboard, or the seat ahead about a lateral tilt axis in response to thrust forces on rapid deceleration of the vehicle which includes a shoulder harness secured at one end to the frame of a headrest and at the other end to a lap type seat belt which harness provides for a limited range of adjustments by an occupant wearing the harness and which includes lock means which are responsive to forces of deceleration to limit movement of an occupant so long as the forces of rapid deceleration are applied.

It is a general object of this invention to provide an improved safety device which includes a harness to resist forward tilting of a wearer in response to rapid deceleration of the vehicle and which is simple and inexpensive to manufacture and is adapted to be used in connection with existing conventional equipment.

It is a more particular object of this invention to provide a safety device, for use in combination with a seat belt and a head rest mounted on a motor vehicle seat, to restrain the upper portion of the body of an occupant against tilting forces on rapid deceleration of the vehicle which safety device is to be used in combination with a lap-type seat belt and provides a shoulder harness secured at one end to a rotatable shaft within the headrest and at the other end to the seat belt and which safey device includes means to restrain rotation of the shaft for limiting movement of a person wearing the shoulder harness to hold them away from the steering column dashboard or the seat ahead in the event of an accident.

In accordance with these and other objects which will become apparent here and after, the instant invention will now be described with reference to the accompanying drawings in which:

FIGURE 3 is a partial view in cross section taken along the plane indicated by the line 3—3 of FIGURE 2 looking in the direction of the arrows;

FIGURE 4 is a view in cross section taken along the plane indicated by the line 4—4 of FIGURE 3 and looking in the direction of the arrows;

FIGURE 5 is an enlarged view of the lower central region of FIGURE 1 as viewed from the exterior of the device;

FIGURE 6 is a view similar to FIGURE 5 and illustrating a manual stop in a different attitude;

FIGURE 7 is a view of lap type seat belts for use in this invention; and

FIGURE 8 is a view in cross section taken along the plane indicated by the line 8—8 of FIGURE 7 and looking in the direction of the arrows.

Figure 1:
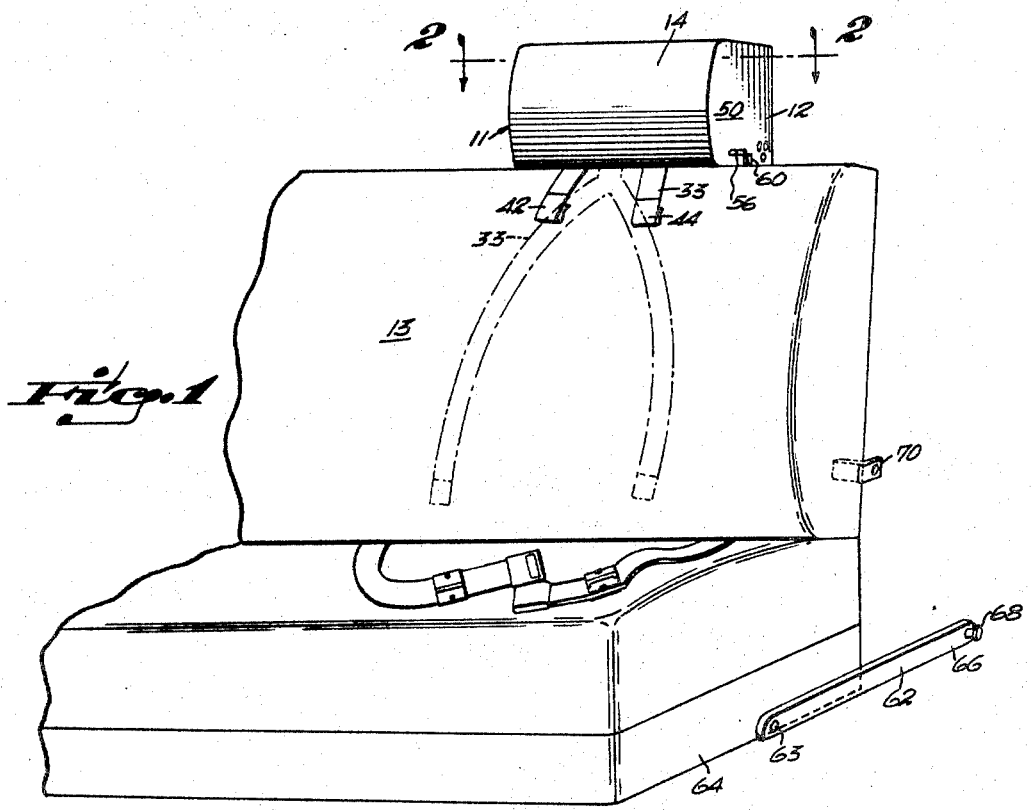
FIGURE 1 is a perspective view of the instant invention mounted to the seat back of a vehicle.
Figure 2:
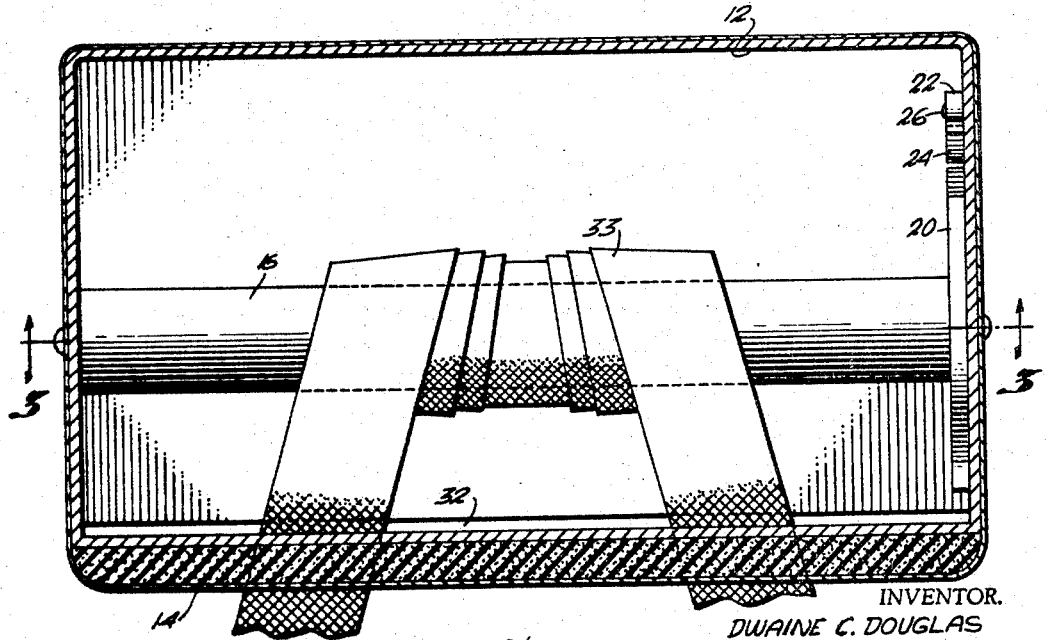
FIGURE 2 is an enlarged view in cross section taken along the plane indicated by the line 2—2 of FIGURE 1 and looking in the direction of the arrows.

Referring to the drawings wherein like reference characters designate like or corresponding parts throughout the different views, it is seen that a headrest 11 is provided and securely fastened to the back 13 of an automobile seat, for example. The headrest comprises rigid frame members of a housing 12 padded exteriorly as at 14. The housing is of a suitable configuration and design to cushion the head of a passenger. A shaft 16 is journalled in spanning relation of the housing 12 and is maintained in a first position of rotation by a coil spring 18. On the shaft 16, a ratchet 20 is provided in close adjacent relation to a lock means for the shaft comprising a free swinging pendulum type pawl 22. A stop 24 is provided adjacent to the pawl to limit rotational movement of it with respect to a pivot 26. Laterally across the floor 30 of the housing, a slot 32 is provided and, through this slot, the distal ends 31, 33 of an inverted Y-shaped harness is adapted to be fed from a coiled position around the shaft with the single proximal end 35 being secured thereto by suitable means to be described. Preferably the harness is of the inverted Y-strap type while strap may be preferred by others.

The harness material is selected from the class of sturdy materials conventionally used by seat belt manufacturers and is of a color compatible with that of the seat belts upholstery and padding for the headrest being used on a particular vehicle. Suitably located mounting holes and brackets not shown are provided on the housing so that the improved harness is adapted to be readily mounted to existing vehicle seat backs.

In use, a person sitting in front of the headrest will merely reach over his shoulder and grasp the distal ends of the harness pulling them down and securing it to fasteners on a lap type seat belt. In the event of any sudden stop the inertia forces will pivot the pawl forwardly through a small arc and against the stop for locking engagement with the next tooth of the ratchet as the same inertia forces tend to thrust the passenger forward.

When the deceleration ceases, that is, when the inertia forces are relaxed, the pawl will be released by gravity forces and the person will again be able to adjust positions. It is thus seen that there has been provided a device which provides for a limited range of movement within an automobile, while at all times the wearer is protected by the shoulder harness. It is seen that the coil spring 18 will yield in response to limited movements of a wearer except on a sudden stop. In the event of a sudden stop, as in an accident, the person will be restrained securely by the forces of the harness and the seat belt because the pawl locks it and resists any further withdrawal of the harness from the coiled position about the shaft. In the preferred embodiment the seat belt conventionally used will be provided with a pair of harness attachment plates having loops 40 through which hooked ends 42 and 44 of the harness are adapted to be engaged. The shaft will be provided with a suitable hook type attachment means for the proximal end of the harness such as indicated in the drawings at 48. Suitable spacers and mounting hardware for the shaft and rachet wheel to journal the same to opposite ends of the housing are provided so as to securely journal the shaft in spanning relation of the housing and provide a firm anchor for the proximal end of the harness.

Referring to FIGURES 5 and 6 it is seen that on the frame member 50 a manual lock 52 is provided for the shaft. This lock includes a rotatable member 54 having a radially extending handle 56 exteriorly of the housing and a radial projection 58 in the housing. The projection 58 is adapted to be rotated from a shaft disengaged position seen in FIGURE 5 to a position, as seen in FIGURE 6, in which shaft rotation is prohibited. In this later position the handle 56 abuts the stop lug 60 to hold the portion 58 so that it will resist shaft rotation when it engages the rachet. Referring to FIGURE 1, it is seen that the vehicle seat is of the bench type, the back of which does not rotate forwardly in a hinge type movement about a lateral tilt axis. In the preferred embodiment the seat is securely braced to resist thrust forces tending to tilt the seat forwardly, irrespective of whether a bench type, as shown, or a single seat. To this end a brace member 62 is pivotally secured as at 63 to the seat base 64 and the upper end 66 is provided with a bolt member 68 to connect to an anchor plate 70 secured to the seat back above the tilt axis.

While the instant invention has been shown and described herein in what is conceived to be the most practical and preferred embodiment, it is recognized that departures may be made therefrom within the scope of the invention.

What is claimed is:

1. For use in combination with a seat belt and a headrest of a motor vehicle seat, a safety device to restrain the upper portion of the body of an occupant of the vehicle seat from tilting forwardly about a lateral tilt axis in response to thrust forces on rapid deceleration of the vehicle comprising:
    a lap-type seat belt;
    a headrest having a slotted lower wall portion and said headrest including,
        a rigid frame adapted to be secured to the back of a vehicle seat;
        a lateral shaft rotatably carried by said frame;
        an inverted Y-shaped shoulder harness having a stem type proximal end and a bifurcated distal end and of an overall length at least as great as the distance between said headrest and the seat;
    means connecting the proximal end to said shaft;
    means to interconnect each of the terminal portions of the distal end to the lap belt;
    means to hold said shaft in a first normal position of rotation with said harness coiled about said shaft and yieldable to forces of withdrawal on the bifurcated end to feed the harness to a maximum length sufficient such that the terminal ends are adapted to be secured by said means to interconnect to said lap belt and to permit a limited range of movement of the occupant,
    said overall length being less than that which will permit the occupant to tilt forward sufficient to impact upon the dashboard, the seat ahead or the steering column; and
    lock means supported by said frame and responsive to forces of deceleration to engage said shaft and limit rotational movement of said shaft on application of rapid forces of deceleration.

2. The improved device as set forth in claim 1 wherein said lock means comprises:
    a ratchet fixed on said shaft;
    a pawl on said housing;
    pivot means supporting said pawl in a normal gravity-induced attitude adjacent the outermost pawl surface rearwardly of said ratchet;
    stop means forwardly of said pivot means whereby under the influence of rapid deceleration the pawl will pivot forwardly into engagement with the stop and with said ratchet to prevent rotation of said shaft.

3. The device as set forth in claim 1 wherein said lock means comprises a member carried on said frame and adapted to engage said shaft to restrain rotation thereof, said member being accessible exteriorly of said headrest.

4. The device as set forth in claim 2 wherein said lock means comprises a member carried on said frame and adapted to engage said ratchet to restrain rotation thereof, said member being accessible exteriorly of said headrest, and stop means adjacent said member to limit reciprocal rotational movement into and out of engagement with said ratchet.

5. The device as set forth in claim 1 wherein said means to hold said shaft comprise spring means coiled about said shaft having one end secured in a fixed position with respect to said housing with the other end secured to said shaft whereby said shaft is adapted to be held in said normal position.

6. The device as set forth in claim 1 wherein said terminal ends are provided with hook type members and said lap belt is provided with loop type members for effecting hooked up engagement of said shoulder harness and said seat belt.

7. For use in combination with a seat belt and a headrest of a motor vehicle seat, a safety device to restrain the upper portion of the body of an occupant of the vehicle seat from tilting forwardly about a lateral tilt axis in response to thrust forces on rapid deceleration of the vehicle comprising:
    a lap-type seat belt;
    a headrest having a slotted lower wall portion and said headrest including,
        a rigid frame adapted to be secured to the back of a vehicle seat;
        a lateral shaft rotatably carried by said frame;
        an inverted Y-shaped shoulder harness having a stem type proximal end and a bifurcated distal end and of an overall length at least as great as the distance between said headrest and the seat;
    means connecting the proximal end to said shaft;
    means to interconnect each of the terminal portions of the distal end to the lap belt;

means to hold said shaft in a first normal position of rotation with said harness coiled about said shaft and yieldable to forces of withdrawal on the bifurcated end to feed the harness to a maximum length sufficient such that the terminal ends are adapted to be secured by said means to interconnect to said lap belt and to permit a limited range of movement of the occupant, said overall length being less than that which will permit the occupant to tilt forward sufficient to impact upon the dashboard, the seat ahead or the steering column.

References Cited

UNITED STATES PATENTS

| 2,879,078 | 3/1959 | Dewees | 297—389 |
| 2,899,146 | 8/1959 | Barecki | 297—389 X |
| 3,321,246 | 5/1967 | Davies | 297—389 |

CASMIR A. NUNBERG, Primary Examiner

U.S. Cl. X.R.

244—122; 280—150; 297—388